July 11, 1972  R. A. JENSEN ET AL  3,676,266

ADHESIVE TAPE DISPENSER

Original Filed Oct 16, 1969  2 Sheets-Sheet 1

INVENTORS
ROBERT A. JENSEN
ORVILLE M. JOHNSON
BY Kinney, Alexander,
Sell, Steldt & De La Hunt
ATTORNEYS July 11, 1972   R. A. JENSEN ET AL   3,676,266
ADHESIVE TAPE DISPENSER
Original Filed Oct 16, 1969   2 Sheets-Sheet 2

INVENTORS
ROBERT A. JENSEN
ORVILLE M. JOHNSON
BY Kinney, Alexander,
Sell, Steldt & DeLaHunt
ATTORNEYS United States Patent Office 3,676,266
Patented July 11, 1972

3,676,266
ADHESIVE TAPE DISPENSER
Robert A. Jensen, St. Paul, and Orville M. Johnson, Falcon Heights, Minn., assignors to Minnesota Mining and Manufacturing Company, St. Paul, Minn.
Continuation of abandoned application Ser. No. 867,004, Oct. 16, 1969. This application Apr. 21, 1971, Ser. No. 136,242
Int. Cl. B32b 31/10; B65b 51/06; B65c 9/36
U.S. Cl. 156—521          10 Claims

ABSTRACT OF THE DISCLOSURE

A pressure-sensitive adhesive tape dispenser in which a rotatable member is formed with a plurality of spaced peripheral tape support areas from which pins extend to pierce and support a length of tape with the adhesive side out to provide advancing and positioning of the tacky tape surface for application and in which the tape length may be severed with the severed length supported at its ends by pins on two adjacent support areas for application.

CROSS-REFERENCE TO RELATED APPLICATIONS

This application is a continuation of U.S. patent application Ser. No. 867,004, filed Oct. 16, 1969, now abandoned.

This invention relates to an improved adhesive tape dispenser and in one aspect to a tape dispenser and applicator in which the tape is supported and advanced adhesive side out on pins extending from a rotatable member.

Prior art adhesive tape dispensers have utilized pins extending from a rotatable member to advance a length of adhesive tape that extends around the member adhesive side out as disclosed in U.S. Pat. 2,107,900 and Canadian Pat. No. 794,196. Such dispensers have generally been found to be advantageous since the pressure-sensitive adhesive surface of the tape tenaciously adheres to any surface which it contacts. Once the tape has adhered to a surface, the only way to break the contact is to pull the surface and the tape apart, an operation which generally involves the adhesion of the tape to some other surface or itself. Thus, by eliminating contact in the dispenser with the adhesive surface of the tape these problems are overcome. However, prior art devices have only been useful as combination tape dispensers and applicators because the entire length of a severed length of tape rests against a solid surface providing access only to the adhesive surface of the tape as in Canadian Pat. No. 794,196 or because the tape is only severed upon forcing a surface to which the tape is to be applied against the adhesive surface as in U.S. Pat. No. 2,107,900.

It is an advantage of the present invention to provide an adhesive tape dispenser in which a severed length of tape is supported adhesive side out only at its ends to provide access to its non-adhesive surface. It is a further advantage to provide a tape dispenser and applicator in which the applicating means moves across an unsupported portion of a severed length of tape to press the adhesive surface of the severed length against an article.

The present invention has the advantages desired of an adhesive tape dispenser and comprises a rotatable member formed with a plurality of spaced peripheral tape support areas defining a tape path about its axis, means for supporting a supply of tape with a free end portion trained adhesive side out along the tape path, pin means extending from each of the tape support areas to pierce and support a length of tape extending along the tape path, and means for severing a length of tape held by its ends on said pin means on two adjacent support areas.

The novel features and advantages of the present invention will become apparent after reading the following description which refers to the accompanying drawing wherein.

Figure 1:
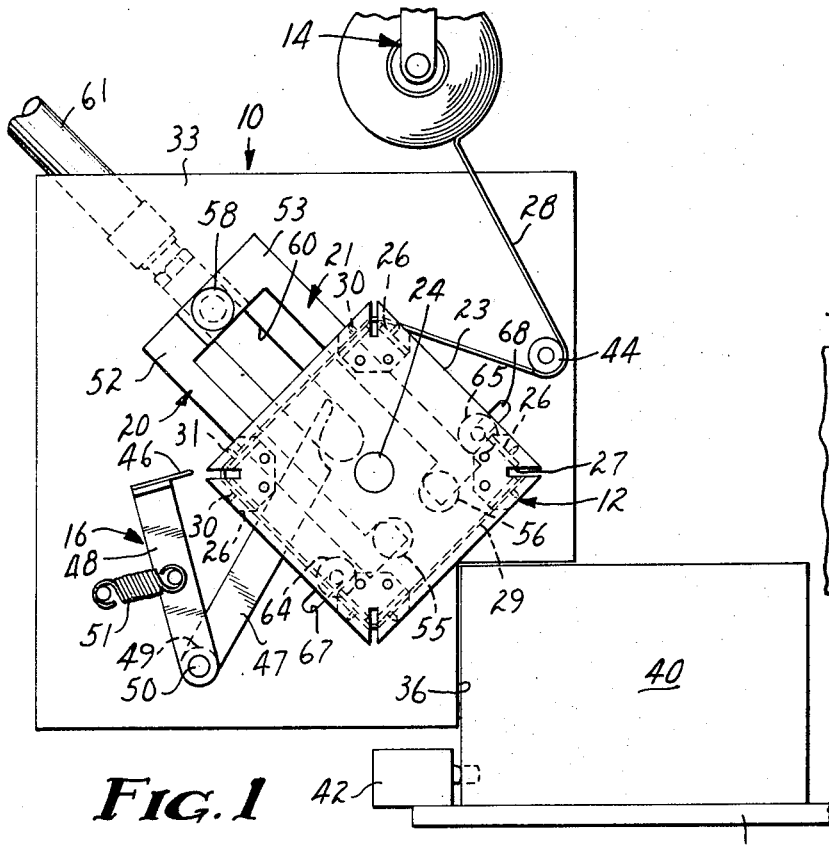
FIG. 1 is an elevational view of one embodiment of a tape dispenser and applicator made in accordance with the present invention.
Figure 3:
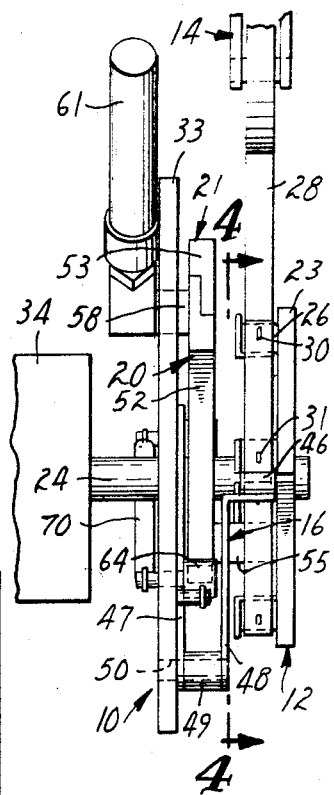
FIG. 3 is an end view of the dispenser and applicator of FIG. 1.
Figure 2:
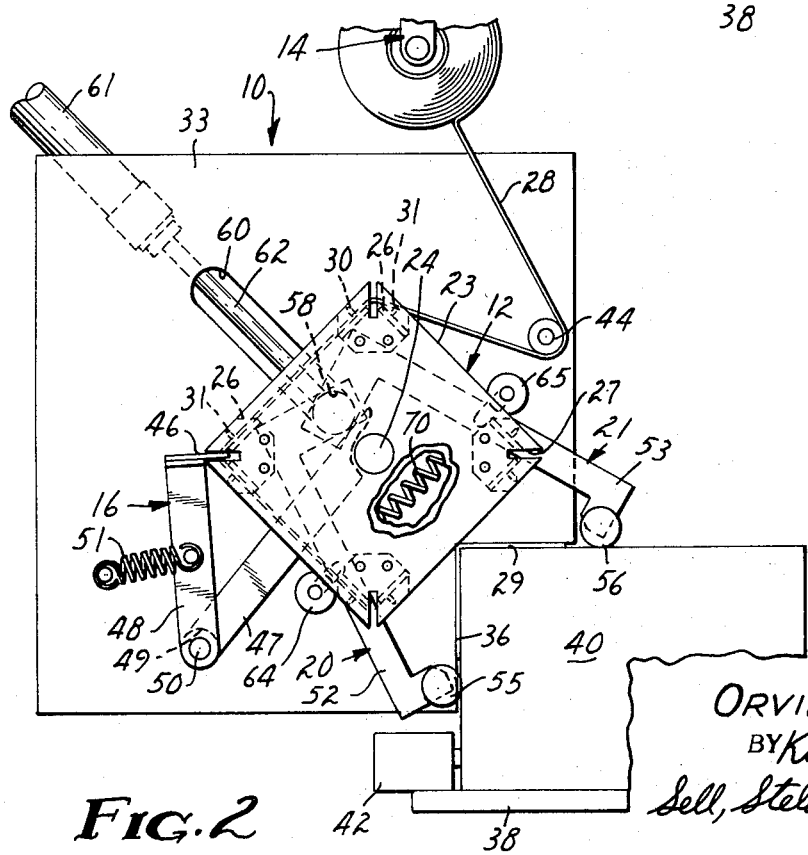
FIG. 2 is an elevational view of the dispenser and applicator of FIG. 1 illustrating an alternate position of the applicator.
Figure 4:
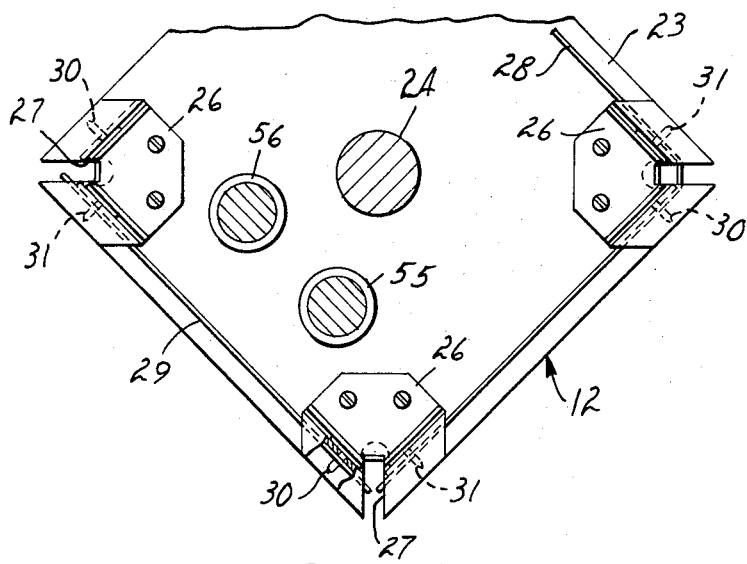
FIG. 4 is an enlarged longitudinal sectional view taken along line 4—4 of FIG. 3.

Referring now to FIGS. 1 through 4 there is illustrated one embodiment of a pressure-sensitive adhesive tape dispenser and applicator made in accordance with the present invention and generally desigated 10. The tape dispenser comprises a rotatable member 12, a tape supply support 14 and cooperating tape severing members. The applicator comprises a pair of resiliently separable jaws 20 and 21.

The rotatable member 12 consists of a square plate 23 supported centrally by a shaft 24 for rotation about an axis perpendicular to its major faces and four similar pentagonal tape support and severing blocks 26. The blocks 26 are secured to the same side of the square plate 23, one at each corner of the plate, to extend parallel to the axis of the shaft 24 to provide four spaced peripheral tape support areas defining a tape path about the axis of the rotatable member 12. Each pentagonal block 26 is secured to the plate 23 with two of its sides parallel to the two adjacent edges of the plate and spaced inward therefrom toward the axis of the shaft 24. At the end spaced from the plate 23 each block 26 is formed with a flange extending parallel to the plate and spaced therefrom a distance slightly greater than the width of the adhesive tape to be dispensed to guide the tape 28 across the peripheral support area defined by the block 26. The four corners of the plate 23 and the portions of the pentagonal blocks 26 in line therewith are slotted to provide a cooperating tape severing member or tape severing slot 27 across the width of the tape support area of each pentagonal member 26. A pair of pins 30 and 31 are secured to the tape support area of each pentagonal block 26 one on each side of the tape severing slot 27 midway of the width of the tape guide path. The pins 30 and 31 each extend perpendicularly from a face of a pentagonal block 26 to pierce a length of tape 28 extending along the tape guide path on both sides of a severing slot 27.

The rotatable member shaft 24 extends perpendicularly through a normally vertical assembly support plate 33 and forms the drive shaft of a motor 34. One of the lower corners of the assembly support plate 33 is formed with a rectangular relief 36 to define two walls of a rectangular tape applicating station at which a length of tape may be applied to two adjacent faces of a rectangular article 40 such as a cardboard box. The intersecting edge of the two walls defining the relief 36 is formed parallel to the drive shaft 24 adjacent the path about the drive shaft axis of the portions of the tape path midway between two pentagonal members 26. The rotatable member 12 is normally positioned with the tape path between two pentagonal members 26 being intersected by the intersecting edge of the walls defining the relief 36.

A normally horizontal conveyor or support plate 38 is positioned to form a third wall of the tape applying station. It is spaced from the horizontal wall of assembly support plate relief 36 a distance generally equal to the height of the rectangular articles 40 to which it is desired to apply a length of the tape 28. A plunger actuated switch 42 is secured to the horizontal support plate 38 and it is positioned at the end of the tape applicating station so as to be activated upon movement of a rectangular article 40 against the vertical wall defining the assembly support plate relief 36.

The tape supply support 14 includes a drum for supporting the tape core vertically above the rotatable member 12 to afford some braking force on the core of a roll of tape 28 and to align the tape with the tape path around the pentagonal members 26. A knurled tape guide roller 44 is rotatably supported on a shaft 46 extending perpendicularly from the assembly support plate 33. The guide roller 45 is positioned in alignment with the tape path above the rotatable member shaft 24 and to the side thereof nearer the tape applicating station to lengthen the tape path about the rotatable member 12 prior to the tape applicating station. The tape supply support 14 positions the roll of tape 28 so that the free end of the tape may be pulled from the roll around the guide roller 44 and then trained adhesive side out along the tape path defined by the tape support areas of the pentagonal tape support and severing blocks 26.

A swinging knife 16 cooperates with the slot 27 of each block 26 to sever the tape and comprises a blade 46 and a pair of arms 47 and 48 rigidly connected by a hollow cylinder 49 that is rotatably supported on a shaft 50 extending perpendicularly from the assembly support plate 33. The arms 47 and 48 are rotatable between the assembly support plate 33 and the pentagonal members 26 with one arm 47 adjacent the support plate 33 and the other arm 48 adjacent the free ends of the pentagonal members 26. The arm 47 adjacent the support plate 33 is formed at its free end to partially mate with the shaft 24 to the side thereof opposite the tape applicating station. The arm 48 adjacent the pentagonal members 26 carries the blade 46 at its free end, the blade 46 extending perpendicularly from the arm 48 transverse to the tape path. The length of the blade 46 and the length and relative positions of the arms 47 and 48 are selected so that when the rotatable member 12 is in its normal position and the arm 47 adjacent the support plate 33 contacts the rotatable member shaft 24, the blade 46 extends into a tape severing slot 27 to sever the tape 28. A tension spring 51 normally biases the swinging knife 16 to position the blade 46 out of the path of the pentagonal members 26.

The tape applicator jaws 20 and 21 each comprise an L-shaped buffing arm 52 or 53 having a buffing roller 55 and 56 respectively. The buffing arms 52 and 53 are similarly rotatably supported at one end on a common shaft 58 that is normally positioned perpendicular to the assembly support plate 33. The buffing arms 55 and 56 are supported to extend between the arms 47 and 48 of the swinging knife 16 to a point between the rotatable member shaft 24 and the tape applicating station. The buffing rollers 55 and 56 are rotatably supported at the free ends of their respective buffing arms 52 and 53 and extend perpendicular to the faces of the arms 52 and 53 transverse to the portion of the tape path lying adjacent the tape applicating station.

The buffing arm shaft 58 extends from the arms perpendicularly through an elongated slot 60 in the assembly support plate 33 and is there supported at the end of a push rod 62 of an air cylinder 61. The elongated slot 60 extends from the normal position of the buffing arm shaft 58 to a point adjacent the rotatable member shaft 24 in alignment with the rotatable member shaft and the edge of the tape applicating station that is normally adjacent the tape path. A pair of buffing arm guide rollers 64 and 65 are rotatably supported on shafts extending through slots 67 and 68 in the assembly support plate, one normally adjacent the opposed outer sides of the buffing arms 52 and 53 near the free ends thereof. A tension spring 70 extends along the back of the assembly support plate 33 between the shafts of the guide rollers 64 and 65 to maintain the buffing arms 52 and 53 in their normal position as illustrated in FIG. 1.

The air cylinder 61 is actuated by depression of the push-pull switch 42 and provides for movement of the push rod 62 to move buffing arm shaft 58 along the elongated slot 60 in the assembly support plate 33. Means are also provided for rotating the rotatable member 12 counterclockwise 90° (as viewed in FIG. 1) after the air cylinder 61 has caused the buffing rollers 55 and 56 to move across the tape path and has retracted them, and the swinging knife blade 46 has entered a tape slot 27 and has been retracted therefrom. In the illustrated embodiment the rotation is provided by the drive motor 34 which is controlled by appropriate electrical circuitry to index the rotatable member 12 through 90° each time it is activated.

In use a roll of pressure-sensitive adhesive tape is placed on the tape supply support 14 and its free end is threaded around the tape guide roller 44 and adhesive side out across the support areas of the pentagonal blocks 26 such that the pins 30 and 31 extending from the pentagonal members 26 pierce the tape. Rotatable member 12 is then rotated counterclockwise (as viewed in FIG. 1) through 90° intervals and the tape is severed at each succeeding tape severing slot 27 until the tape is in position as illustrated in FIG. 1. The tape dispenser and applicator are then ready for normal use.

To actuate the tape dispenser and applicator the rectangular article 40 is moved into the tape applicating station against the plunger actuated switch 42. Depression of the plunger of the switch 42 activates the air cylinder 61 to move the push rod 62 and the buffing arm shaft 58 along the elongated slot 60 in the assembly support plate 33. As the buffing arm shaft 58 moves along the elongated slot 60 the buffing arm rollers 55 and 56 are caused to be moved across the tape path between a pair of pentagonal members 26 to contact the non-adhesive side of a severed length of tape 29 and to push the severed length of tape off the support pins 30 and 31 and onto two perpendicular faces of the rectangular article 40. Upon further movement of the buffing rollers 55 and 56 they wipe the severed length of tape 29 onto the faces of the article 40. In following the perpendicular faces of the article 40 the buffing rollers 55 and 56 cause the buffing arms 52 and 53 to rotate about their support shaft 58 against the bias of tension spring 70.

As the buffing arm shaft approaches the rotatable member shaft 24 it contacts the swinging knife arm 47 that lies adjacent the assembly support plate 33 and rotates the swinging knife 16 about its support shaft 50 to actuate the knife 16. This causes the blade 46 to move across the tape path into a tape severing slot 27 and severs a length of tape 29 which is then supported at its ends adhesive side out by pins 30 and 31 on two adjacent tape support areas defined by two adjacent tape support blocks 26. Upon moving the swinging knife arm 27 against the rotatable member shaft 24 the air cylinder 61 is deactivated and retracts the push rod 62 and buffing arm shaft 58, thereby retracting the buffing arms 52 and 53 and the buffing rollers 55 and 56. As the buffing arms are retracted the tension spring 70 through guide rollers 64 and 65 biases the buffing arms 53 and 52 back into their normal position. Retraction of the buffing arm shaft 58 also permits the swinging knife spring 51 to retract the blade 46 from the tape severing slot 27. Upon retraction of the buffing arms 52 and 53 and the swinging knife 16 the rotatable member 12 is rotated through 90° as aforedescribed and the apparatus is in position to dispense and apply another severed length of tape 29.

Figure 5:
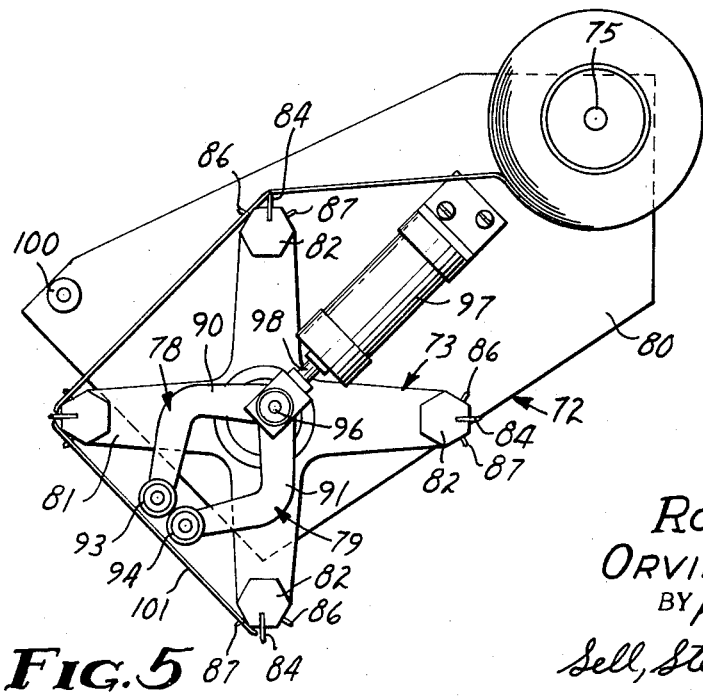
FIG. 5 is an elevational view of a second embodiment of the present invention.

Referring now to FIG. 5, there is illustrated a second embodiment of the present invention generally designated 72. Like the first embodiment, the tape dispenser comprises a rotatable member 73, a tape supply support 75, and cooperating tape severing members, and the applicator comprises a pair of resiliently expandable jaws 78 and 79.

The rotatable member 73 consists of a body 81 having a hub and four similar radial spokes at 90° intervals and four hexagonal tape support and severing blocks 82. The blocks 82 are secured to the same side of the spokes, one at the end of each spoke, to extend parallel to the axis of rotation of the rotatable member 73 to provide four-spaced peripheral tape support areas defining a tape path about the axis of the rotatable member 73. A cooperating tape severing member or blade 84 is secured to each of the blocks 82 to extend radially from the periphery of the rotatable member 73 across the tape path. A pair of pins 86 and 87 are secured to the tape support area of each block 82 one on each side of the tape severing blade 84 and midway of the width of the tape guide path. The pins 86 and 87 each extend perpendicularly from a face of a hexagonal block 82 to pierce the length of tape extending along the tape guide path on both sides of a severing blade 84.

The tape applicator jaws 78 and 79 each comprise an L-shaped buffing arm 90 and 91 and a buffing roller 93 and 94. The buffing arms 90 and 91 are similarly rotatably supported at one end on a common shaft 96 to one side of the rotatable member 73. The buffing rollers 93 and 94 are rotatably supported at the free ends of their respective buffing arms 90 and 91 and extend perpendicular to the faces of the arms 90 and 91 transverse to the portion of the tape path between two tape support blocks generally midway therebetween. The buffing arms 90 and 91 are biased by a tension spring (not shown) to bias the buffing rollers 93 and 94 into contact with each other. The buffing arm shaft is carried at the end of the push rod 98 of an air cylinder 97 to provide movement of the buffing rollers 93 and 94 across the tape path.

The tape support 75 extends from the assembly support plate 80 to support a roll of pressure-sensitive adhesive tape to the opposed side of the rotatable member 73 from the buffing rollers 93 and 94. The tape support 75 positions the roll of tape in alignment with the tape path around the rotatable member 73 so that the free end of the tape may be trained adhesive side out along the tape path defined by the support areas of the hexagonal blocks 82. A striker roller 100 extends from the assembly support plate 80 counterclockwise about the axis of the rotatable member 73 from the tape support 75. It is positioned at the periphery of a circle swept out by the tape severing blade 84 about the axis of the rotatable member 73 to cooperate with the blades 84 in severing the tape.

While the tape applicating station is not illustrated in this embodiment, it can be easily seen that it would be located on the opposed side of the tape path from the buffing rollers 55 and 56. The tape buffing arms 90 and 91 and buffing rollers 93 and 94 are well adapted to buffing a severed length of tape 101 around a coil of wire or a bundle of elongated articles to make a flag-type seal. Means are also provided for rotating the rotatable member 73 through 90° intervals counterclockwise (as viewed in FIG. 5) from the normal position illustrated in FIG. 5.

In use a roll of pressure-sensitive adhesive tape is placed on the tape support 75 and the free end thereof is pulled with the adhesive side out around the tape support blocks 82 along the tape path. The rotatable member 73 is then rotated until the tape is positioned as illustrated in FIG. 5 with a severed length of tape supported by pins on two adjacent blocks 82 adjacent the buffing rollers 93 and 94. The tape dispenser and applicator is then ready for normal use.

Upon actuation of the tape dispenser and applicator, the air cylinder push rod moves the buffing rollers 93 and 94 across the tape path between a pair of tape support blocks 82 to contact the non-adhesive surface of the severed length of tape to buff the adhesive surface of the tape onto an article positioned on the opposed side of the tape. Upon completion of the buffing, the air cylinder is deactivated retracting the buffing rollers 93 and 94 to their normal positions. The rotatable member 73 is then indexed 90° as heretoforedescribed. As the rotatable member 73 is indexed, a blade 84 extending from a tape support block 82 contacts the striker roller 100 and severs the next succesive length of tape which upon completion of the indexing of the rotatable member 73 comes into position adjacent the buffing rollers 93 and 94. The apparatus is then in position to dispense and apply another severed length of tape 101.

Having thus described the present invention with reference to two embodiments, what is claimed is:

1. A pressure-sensitive adhesive tape dispenser comprising:

a rotatable member comprising a support frame extending radially from the axis of rotation of said rotatable member and means secured to said support frame defining a plurality of similar spaced peripheral tape support areas extending axially from said support frame defining a tape path about said axis of rotation, which tape path is accessible between two adjacent support areas to tape applicating means movable across said tape path and positioned radially inward of said tape path, means for supporting a supply of tape with a free end portion trained adhesive side out along said path, pin means extending from each of said support areas to pierce and support the ends of a length of tape that extends between two adjacent support areas, and means for severing a said length of tape with its ends supported by pin means on two adjacent support areas.

2. A tape dispenser as recited in claim 1 wherein said pin means comprise at least two spaced pins on each said area to pierce a said length of tape at two arcuately spaced positions on each said support area, and wherein said tape severing means comprises a cooperating severing member on each of said support areas to sever a said length of tape between said two spaced pins on each said support area.

3. A tape dispenser as recited in claim 2 wherein said support areas are similarly positioned at equally spaced intervals to provide dispensing of similar severed lengths of tape.

4. A pressure-sensitive adhesive tape dispenser and applicator comprising:

a rotatable member comprising a support frame extending radially from the axis of rotation of said rotatable member and means secured to said support frame defining a plurality of similar spaced peripheral tape support areas extending axially from said support frame defining a tape path about said axis of rotation, which tape path is accessible between two adjacent support areas to tape applicating means movable across said tape path and positioned radially inward of said tape path, means defining a tape applying station adjacent the path of said support areas about the axis of said member, means for supporting a supply of tape with a free end portion trained adhesive side out along said tape path in advance of said tape applying station, pin means extending from each of said support areas to pierce and support the ends of a length of tape that extends between two adjacent support areas, means for severing a said length of tape with its ends supported by pin means on two adjacent support areas, and tape applicating means positioned radially inward of said tape path and movable across the path of a severed length of tape extending between two adjacent support areas to press the adhesive surface of a said severed length of tape against an article at said applying station.

5. A tape dispenser and applicator as recited in claim 4 wherein said pin means comprises at least two spaced pins on each said area to pierce a said length of tape at two arcuately spaced positions on each said support area and wherein said tape severing means includes a cooperating tape severing member on each of said support areas to sever a said length of tape between said two spaced pins on each said support area.

6. A tape dispenser and applicator as recited in claim 5 wherein said rotatable member includes a plurality of polyhedral members, each said polyhedral member being positioned with two adjacent planar faces defining a said tape support area and wherein one of said pins extends from each of said two adjacent planar faces.

7. A tape dispenser and applicator as recited in claim 6 wherein said support areas are similarly positioned about said member axis at equally spaced arcuate intervals to provide dispensing and applicating of similar severed lengths of tape.

8. A tape dispenser and applicator as recited in claim 6 wherein said means defining cooperating tape severing members comprises means defining a slot across the tape path between said two spaced pins on each said polyhedral member and a tape severing blade movable into each said slot to sever a said length of tape.

9. A tape dispenser and applicator as recited in claim 8 including means for moving said tape severing blade into a said slot in response to movement of said tape applicating means across said path of a severed length of tape.

10. A tape dispenser and applicator as recited in claim 4 wherein said tape applicating means includes a pair of resiliently separable jaws positioned to press the adhesive surface of a severed length of tape along two surfaces of an article at said tape applying station upon movement of said jaws across said tape path.

References Cited

UNITED STATES PATENTS

| | | | |
|---|---|---|---|
| 3,454,452 | 7/1969 | Franzene | 156—518 |
| 3,535,189 | 10/1970 | Hall et al. | 156—486 |
| 3,561,190 | 2/1971 | Derenthal | 156—486 X |
| 3,577,293 | 5/1971 | Ritterhoff | 156—521 X |
| 3,600,253 | 8/1971 | Derenthal | 156—486 X |

FOREIGN PATENTS 794,196  9/1968  Canada.

HAROLD ANSHER, Primary Examiner

U.S. Cl. X.R.

156—511, 566